Patented Mar. 17, 1936

2,034,435

UNITED STATES PATENT OFFICE 2,034,435

COATED PAPER

Clark C. Heritage, Rumford, Maine, assignor to Oxford Paper Company, a corporation of Maine No Drawing. Original application October 26, 1932, Serial No. 639,735. Divided and this application April 10, 1933, Serial No. 665,339

6 Claims. (Cl. 91—68)

This application is divisional of my copending application Serial Number 639,735 filed October 26, 1932 and relating to a paper coating composition and process of making the same. The invention of this application relates to the paper coated with the said composition.

The coated paper which is the subject of this invention combines a number of desirable characteristics which have not heretofore been attainable together in one product. The nature of coatings has been such that certain characteristics could only be obtained at a sacrifice of others.

The coating itself as disclosed and claimed in my said copending application is of course responsible for the finished characteristics presented by the paper. Among its advantages pointed out in that application is the fact that the coating is of high whiteness and is easily polished. For example it is capable of being polished with low calender pressures to a high gloss attainable with previous coatings only with flint or other special processes. Thus the blackening which results from high calender pressures may be obviated. Also due to the avoidance of hard calendering the absorption of the coated paper to printing ink may be kept normal.

Another advantage of the coating is the fact that it is satisfactorily bound for any normal printing process and requires less adhesive than other comparable coatings, wherefore the coated paper has a higher degree of flexibility than is afforded by such other coatings.

In addition to the high gloss, the coating when properly treated also affords a surface peculiarly free from roughness or mottle. The superiority of the coated paper in respect to the smoothness of its surface, in spite of the relatively light calendering required, is readily apparent on visual examination.

The desirable physical properties of the coated paper to which this application relates include, therefore, excellent brightness of color with high opacity, high gloss, absence of blackening, normal ink absorption, flexibility, freedom from mottle and peculiar smoothness. These and other properties will be further elaborated hereinafter.

The method for producing the coated sheet, which method constitutes a part of this invention, includes forming a coating composition by precipitating a compound pigment directly upon a base pigment, coating a paper with the composition so formed, and calendering the dried coat with a light pressure. Specifically, in the preferred embodiment, a white coating is produced by precipitating calcium sulphate and aluminum hydroxide directly upon particles of a base pigment, such as clay suspended in water, and adding an appropriate adhesive such as casein thereto. The coating mixture thus prepared is applied to paper stock and dried thereon. Thereafter the coated paper is calendered with a light pressure.

In carrying out the process in this particular form, lime, alum and clay will be kept on hand in dry form and when the coating is to be prepared a suspension of the clay in water will be produced, and lime incorporated therewith to form a slip or suspension of clay and calcium hydroxide. The respective materials are well mixed and thoroughly incorporated together, and then alum in solution is added to the slip, followed by a small amount of alkali, causing a precipitation of calcium sulphate and aluminum hydroxide in the presence of the clay particles. It is probable that the particles of clay are thoroughly enveloped in the enrobing layer of voluminous aluminum hydroxide carrying the calcium sulphate precipitate. The material thus produced makes the potential new and useful properties in the coating when the material is applied upon paper.

In preparing the product of this invention and in practicing the process, the following materials in substantially the proportions and manner given may be used, it being understood that this is merely illustrative and that the proportions may vary substantially according to the precise results desired:

| | Parts |
|---|---|
| Cold water | 75 |
| English china clay | 50 |
| Hydrated lime | 14 |
| Water | 23 |
| Alum | 17 |
| Water | 7 |
| Soda ash | 0.5 |
| Ammonia | 0.2 |
| Water | 55 |
| Casein | 15 |

The process may be begun by mixing the cold water and the clay in an appropriate container with the hydrated lime. This mixture should be stirred for about twenty minutes, that is, stirring should be begun when the water is in the mixing vessel, and continued for a somewhat longer time than is required for the addition of the dry solids to the container. The alum should be separately dissolved in the second quantity of water and heated to a temperature of 42° C. When this temperature is reached the alum solution is added to the mixture or slip of lime and clay in water as rapidly as possible. After the addition of the alum solution the stirring should be continued for about two and a half hours. The reaction between the lime and alum will raise the temperature to about 65° C.

The soda ash is to be dissolved in the third quantity of water at a boiling temperature and added to the composition at the end of the two and a half hours of stirring. Simultaneously with the addition of the soda ash, cooling water in a coil or jacket of the mixing vessel should be turned on and the preparation cooled as rapidly as possible to 25° C. When this temperature is reached, the ammonia of 26° Baumé or a specific gravity of 0.8974 is added, and the stirring continued for five minutes longer.

The casein solution is separately made in substantially the quantity indicated and after the ammonia is added to the mixture and the mixture stirred the required five minutes, 14 parts of the casein solution are added to the preparation, and the stirring continued for at least one hour and preferably two hours. At the end of this period the remainder of the casein solution is added. The preparation is then ready for use. If, however, it is not required for immediate use, or the entire quantity is not transferred at once to the coating machine, stirring should be continued until the preparation has been entirely removed from the mixing vessel. It appears that the continuance of the stirring is desirable to maintain the homogeneity of the preparation, and to maintain other of the desirable properties.

The material prepared by the process above described is a very satisfactory coating material having desirable physical properties surpassing those of other coating preparations. The fact that the precipitation of the white pigment material has occurred in the presence of the clay results in a more thorough distribution of the pigment, each particle of the filler being more completely coated with the pigment than is possible to effect by stirring previously formed pigment into a clay suspension in water.

It may be noted that a small proportion of soda ash is added to the mixture after the primary reaction is complete. It is found that the addition of this small quantity of soda ash produces beneficial results by improving the obtainable polish, increasing the smoothness of the finished paper sheet, and improving the ink absorption. The ammonia added with the soda ash is found to improve the working qualities of the prepared pigment on the coating machine, and to minimize settling of the pigment. It also appears to have a beneficial effect upon the adhesive, and to improve the physical state of the pigment precipitate.

The coating mixture as thus prepared is then applied to paper stock in the usual way in the usual type of coating machine, and dried in the usual way.

After drying the material may be calendered in the usual type of calendering roll stand, but the response of the coating to calendering operations is quite different in character from that of other coatings. The obtained gloss is higher than that obtainable by simple super-calendering of other coating preparations suitable for coating job printing paper. This extremely high gloss combined with excellent smoothness is also obtained by a calender roll pressure which is substantially less than that used for calendering other white coatings, and is accompanied by no blackening or discoloration. Furthermore, the complete coating in spite of the extremely high gloss is well bound, and has rapid absorption of printing ink, a property not usually characteristic of highly calendered gloss coatings.

It has been found possible to obtain a glass of 90% and even higher as measured on the Ingersoll glarimeter, without blackening. The resulting surface is substantially free from roughness or mottling of any kind.

The main advantage of the coating in producing the characteristic properties of the coated paper is considered to result from the precipitation of a pigment of high whiteness directly upon a bulky base pigment, and so far clay as a base pigment and alum and lime as the reacting agents give the best results. It is, however, to be understood that other reacting agents may be used. Other base pigments than clay may also be used, such as barytes, zinc oxide, lithopone, etc. Likewise, other alums or sulphates may be used, such as magnesium sulphate and zinc sulphate. If a colored coating is desired, it is of course possible to substitute other alums or sulphates of metals forming colored compounds such as iron, chromium, copper, etc. Likewise, the lime as calcium oxide may be replaced by dolmitic lime containing magnesium, as well as by other substances which will be obvious to those skilled in the art. Certain other desirable effects may also be obtained by the addition of small quantities of certain other pigments. For instance, small proportions of titanium dioxide, or preparations containing titanium dioxide, may be added to the mixture at an appropriate stage in the preparation thereof. Likewise talc and other equivalent substances also produce desirable effects for certain purposes obvious to those skilled in the art.

Modifications of the product and process for producing it as above described will readily occur to those skilled in the art without departing from the scope of my invention, and it is accordingly desired that only such limitations shall be imposed upon the appended claims as are stated therein or required by the prior art.

I claim:

1. The process for making a coated paper comprising mixing together a base pigment, lime and water, adding to the slurry so formed a solution of an alum, adding an alkali to the reacting mixture, adding an adhesive to the mixture, and coating the composition upon paper.

2. The process of preparing a coated paper comprising the steps of mixing clay in water, adding thereto lime to produce a slurry, thereafter adding an lum in solution and an alkali to precipitate a calcium-aluminum compound pigment upon the clay, further adding an adhesive solution thereto and coating the composition upon paper.

3. The process of preparing a coated paper comprising the steps of mixing clay in water, adding thereto lime to produce a slurry, thereafter adding an alum in solution and an alkali to precipitate a calcium-aluminum compound pigment upon the clay, further adding an adhesive solution thereto, coating the composition upon paper, and calendering the dried coat with a light pressure.

4. A paper made by the process of mixing together a base pigment, lime and water, adding to the slurry so formed a solution of an alum, adding an alkali to the reacting mixture, adding an adhesive to the mixture, and coating the composition upon paper.

5. A paper made by the process of mixing clay in water, adding thereto lime to produce a slurry, thereafter adding an alum in solution and an alkali to precipitate a calcium-aluminum compound pigment upon the clay, further adding an adhesive solution thereto and coating the composition upon paper.

6. A paper made by the process of mixing clay in water, adding thereto lime to produce a slurry, thereafter adding an alum in solution and an alkali to precipitate a calcium-aluminum compound pigment upon the clay, further adding an adhesive solution thereto, coating the composition upon paper, and calendering the dried coat with a light pressure.

CLARK C. HERITAGE.